US010429166B2

(12) United States Patent
Nakagawa et al.

(10) Patent No.: US 10,429,166 B2
(45) Date of Patent: Oct. 1, 2019

(54) COORDINATE MEASURING MACHINE AND COORDINATE CORRECTION METHOD

(71) Applicant: MITUTOYO CORPORATION, Kanagawa (JP)

(72) Inventors: Hideyuki Nakagawa, Ibaraki (JP); Nobuhiro Ishikawa, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 189 days.

(21) Appl. No.: 15/680,653

(22) Filed: Aug. 18, 2017

(65) Prior Publication Data
US 2018/0058832 A1    Mar. 1, 2018

(30) Foreign Application Priority Data

Aug. 26, 2016   (JP) ................................. 2016-166343

(51) Int. Cl.
| G01B 5/008 | (2006.01) |
| G01B 3/22 | (2006.01) |
| G01B 21/04 | (2006.01) |

(52) U.S. Cl.
CPC .............. G01B 3/22 (2013.01); G01B 5/008 (2013.01); G01B 21/042 (2013.01); G01B 21/045 (2013.01)

(58) Field of Classification Search
CPC .................................... G01B 3/12; G01B 5/02
(Continued)

(56) References Cited

U.S. PATENT DOCUMENTS

| 5,125,261 A | 6/1992 | Powley |
| 6,909,983 B2 | 6/2005 | Sutherland |

(Continued)

FOREIGN PATENT DOCUMENTS

| DE | 4325602 C1 | 9/1994 |
| DE | 102011053117 A1 | 3/2012 |

(Continued)

OTHER PUBLICATIONS

Office Action issued in Japan family member Patent Appl. No. 2016-166343, dated Feb. 13, 2018, along with an English translation thereof.

(Continued)

*Primary Examiner* — George B Bennett
(74) *Attorney, Agent, or Firm* — Greenblum & Bernstein, P.L.C.

(57) ABSTRACT

A processing device includes: a coordinate acquisition unit that acquires a moving amount of a measuring probe and a probe output; a matrix generation unit that generates a correction matrix including linear correction elements and non-linear correction elements; and a probe output correction unit that corrects the probe output with the correction matrix. The coordinate acquisition unit acquires the moving amount and the probe output of the measuring probe in each of measurement points in a quantity larger than or equal to the sum of the number of the linear correction elements and the number of the non-linear correction elements. Consequently, a non-linear error of the probe output supplied from the measuring probe can be corrected, and thus shape coordinates of an object to be measured can be obtained with high accuracy.

10 Claims, 11 Drawing Sheets

(58) Field of Classification Search
USPC .......................................................... 33/503
See application file for complete search history.

(56) References Cited

U.S. PATENT DOCUMENTS

| | | | |
|---|---|---|---|
| 7,131,207 | B2 | 11/2006 | McFarland |
| 7,353,616 | B2 | 4/2008 | Matsumoto et al. |
| 7,885,777 | B2 | 2/2011 | Jonas et al. |
| 7,900,367 | B2 | 3/2011 | Sutherland |
| 7,913,537 | B2 | 3/2011 | Petterson |
| 8,825,427 | B2 | 9/2014 | Kunzmann et al. |
| 8,983,795 | B2 | 3/2015 | Lotze et al. |
| 9,091,522 | B2 | 7/2015 | Nakagawa et al. |
| 9,097,504 | B2 | 8/2015 | Ishikawa et al. |
| 9,459,096 | B2 | 10/2016 | Guasco |
| 9,464,877 | B2 | 10/2016 | Nakagawa et al. |
| 9,683,839 | B2 | 6/2017 | Nakagawa et al. |
| 9,719,779 | B2 | 8/2017 | Ishikawa et al. |
| 9,746,303 | B2 | 8/2017 | Nakagawa et al. |
| 2010/0132432 | A1* | 6/2010 | Wallace ............ G01B 21/045 73/1.75 |
| 2011/0161046 | A1 | 6/2011 | Chang et al. |
| 2012/0084989 | A1* | 4/2012 | Pettersson ........... G01B 21/045 33/503 |
| 2014/0071460 | A1* | 3/2014 | Suzuki ................. G01B 5/008 356/614 |
| 2014/0259715 | A1* | 9/2014 | Engel ................. G01B 11/007 33/503 |
| 2015/0241194 | A1 | 8/2015 | Nakagawa et al. |
| 2016/0131470 | A1* | 5/2016 | Ishikawa ............ G01B 21/045 33/503 |
| 2017/0248400 | A1 | 8/2017 | Koga et al. |
| 2017/0248402 | A1 | 8/2017 | Koga et al. |

FOREIGN PATENT DOCUMENTS

| | | |
|---|---|---|
| EP | 2172735 A2 | 4/2010 |
| EP | 2543955 A1 | 1/2013 |
| EP | 2733460 A1 | 5/2014 |
| EP | 2910895 A1 | 8/2015 |
| JP | H02-284216 A | 11/1990 |
| JP | 2002-528709 A | 9/2002 |
| JP | 2004-108959 A | 4/2004 |
| JP | 2004-521343 A | 7/2004 |
| JP | 2005-181293 A | 7/2005 |
| JP | 2006-329795 A | 12/2006 |
| JP | 2007-183184 A | 7/2007 |
| JP | 2008-539408 A | 11/2008 |
| JP | 2009-516195 A | 4/2009 |
| JP | 2009-534681 A | 9/2009 |
| JP | 2010-145211 A | 7/2010 |
| JP | 2011-503628 A | 1/2011 |
| JP | 2013-015464 A | 1/2013 |
| JP | 5297787 B2 | 9/2013 |
| JP | 2015-158387 A | 9/2015 |
| JP | 2016-090434 A | 5/2016 |
| WO | 02/073128 A1 | 9/2002 |
| WO | 2004/051179 A1 | 6/2004 |
| WO | 2007/058610 A1 | 5/2007 |

OTHER PUBLICATIONS

Office Action issued in Japan family member Patent Appl. No. 2016-166344, dated Feb. 13, 2018, along with an English translation thereof.
U.S. Appl. No. 15/681,926 to Hideyuki Nakagawa et al., filed Aug. 21, 2017.
U.S. Appl. No. 15/682,904 to Hideyuki Nakagawa et al., filed Aug. 22, 2017.
Official Communication issued in European Patent Office (EPO) Patent Application No. 17187463.9, dated Jan. 3, 2018.
Official Communication issued in European Patent Office (EPO) Patent Application No. 17187937.2, dated Jan. 3, 2018.
Official Communication issued in European Patent Office (EPO) Patent Application No. 17187935.6, dated Jan. 16, 2018.
Office Action issued in European Patent Office (EPO) family member Patent Appl. No. 17187937.2, dated Nov. 21, 2018.
Notice of Reasons for Rejection issued in Japanese family member Patent Appl. No. 2016-166343, dated Mar. 28, 2019, along with an English translation thereof.

* cited by examiner

COORDINATE MEASURING MACHINE AND COORDINATE CORRECTION METHOD

CROSS-REFERENCE TO RELATED APPLICATION

The disclosure of Japanese Patent Application No. 2016-166343 filed on Aug. 26, 2016 including specifications, drawings and claims is incorporated herein by reference in its entirety.

TECHNICAL FIELD

The present invention relates to a coordinate measuring machine and a coordinate correction method, and more particularly, to a coordinate measuring machine and a coordinate correction method of a probe coordinate system that can correct a non-linear error of a probe output supplied from a measuring probe and thus enable the obtainment of shape coordinates of an object to be measured with high accuracy.

BACKGROUND ART

A conventionally known coordinate measuring machine includes: a measuring probe that movably supports a stylus having a measurement tip (contact member) to be brought into contact with an object to be measured and provides a probe output according to a displacement of the measurement tip; a drive mechanism that holds and moves the measuring probe; and a processing device that computes shape coordinates of the object to be measured on the basis of the probe output and a moving amount of the measuring probe by the drive mechanism. This processing device can compute shape coordinates $\{x, y, z\}^T$ (also simply referred to as "X") shown in Formula (1) by adding a moving amount $\{x_m, y_m, z_m\}^T$ (also simply referred to as "M") of the measuring probe by the drive mechanism in an machine coordinate system, which is a coordinate system of the coordinate measuring machine, and a probe output $\{x_p, y_p, z_p\}^T$ (also simply referred to as "P") in a probe coordinate system, which is a coordinate system of the measuring probe.

$$\begin{Bmatrix} x \\ y \\ z \end{Bmatrix} = \begin{Bmatrix} x_m \\ y_m \\ z_m \end{Bmatrix} + \begin{Bmatrix} x_p \\ y_p \\ z_p \end{Bmatrix} \quad \text{Formula (1)}$$

To reduce errors resulting from discrepancy between the machine coordinate system and the probe coordinate system, Japanese Patent No. 5297787 (hereinafter, referred to as Patent Literature 1) has proposed a method in which the measuring probe is driven by the drive mechanism while a translational displacement of the measurement tip is restrained, and a correction matrix A is generated on the basis of the moving amount M and the probe output P of the measuring probe at each of a plurality of measurement points. With the obtained correction matrix A, the probe output P can be transformed into a transformed output $\{x_{p\_m}, y_{p\_m}, z_{p\_m}\}^T$ (also simply referred to as "PM") in the machine coordinate system as shown in Formula (2). Thereafter, the shape coordinates X can be computed by adding the moving amount M of the measuring probe and the transformed output PM as shown in Formula (3).

$$\begin{Bmatrix} x_{p\_m} \\ y_{p\_m} \\ z_{p\_m} \end{Bmatrix} = \begin{bmatrix} A_{11} & A_{12} & A_{13} \\ A_{21} & A_{22} & A_{23} \\ A_{31} & A_{32} & A_{33} \end{bmatrix} \begin{Bmatrix} x_p \\ y_p \\ z_p \end{Bmatrix} \quad \text{Formula (2)}$$

$$\begin{Bmatrix} x \\ y \\ z \end{Bmatrix} = \begin{Bmatrix} x_m \\ y_m \\ z_m \end{Bmatrix} + \begin{Bmatrix} x_{p\_m} \\ y_{p\_m} \\ z_{p\_m} \end{Bmatrix} \quad \text{Formula (3)}$$

Where $\begin{bmatrix} A_{11} & A_{12} & A_{13} \\ A_{21} & A_{22} & A_{23} \\ A_{31} & A_{32} & A_{33} \end{bmatrix}$: Correction matrix A Note that reference characters $A_{11}$ to $A_{33}$ represent correction elements that constitute the correction matrix A, and correct respective coordinate components of the probe output P.

SUMMARY OF INVENTION

Technical Problem

In Patent Literature 1, however, only first-order coordinate components (referred to as linear coordinate components) of the probe output P can be corrected with the correction elements $A_{11}$ to $A_{33}$ in the correction matrix A. Here, a so-called spring structure (including a spring body and a guide for the spring body) in a member for movably supporting the stylus in the measuring probe or a probe sensor for detecting a displacement of the stylus, for example, may not necessarily respond linearly in all of three directions. When a spring constant of the spring structure is non-linear, for example, a change in distance between the measurement tip and the drive mechanism in a direction in which the spring constant is non-linear may cause a non-linear change of the measurement tip in that direction. Moreover, a non-linear response of the spring structure, for example, may cause an arc motion of the measurement tip when a measurement force in a certain direction is applied to the measurement tip and thus cause a displacement of the measurement tip. Furthermore, a non-linear response of the probe sensor, for example, may lead to the inclusion of a non-linear error in the probe output. In other words, even when errors resulting from discrepancy between the machine coordinate system and the probe coordinate system are eliminated, there is a possibility of failing to eliminate a non-linear error in a probe output supplied from the measuring probe if the above-described spring structure or probe sensor provides a non-linear response.

The present invention has been made in order to solve the above-described problems in the conventional technique, and an object thereof is to provide a coordinate measuring machine and a coordinate correction method that can correct a non-linear error of a probe output supplied from a measuring probe and thus enable the obtainment of shape coordinates of an object to be measured with high accuracy.

Solution to Problem

To solve the above-described problems, an aspect of the present invention provides a coordinate measuring machine including: a measuring probe for movably supporting a stylus having a measurement tip to be brought into contact with an object to be measured and for providing a probe output according to a displacement of the measurement tip;

a drive mechanism for moving the measuring probe relative to the object to be measured; and a processing device for computing shape coordinates of the object to be measured on the basis of the probe output and a moving amount of the measuring probe by the drive mechanism. The coordinate measuring machine includes restraining unit for restraining a translational displacement of the measurement tip. The processing device includes: a coordinate acquisition unit for acquiring the moving amount and the probe output of the measuring probe when the measuring probe is moved by the drive mechanism in a state where the measurement tip is restrained by the restraining unit; a matrix generation unit for generating a correction matrix including linear correction elements and non-linear correction elements for respectively correcting linear coordinate components and non-linear coordinate components of the probe output with respect to the moving amount of the measuring probe on the basis of an output of the coordinate acquisition unit; and a probe output correction unit for correcting the probe output with the correction matrix. The coordinate acquisition unit acquires the moving amount and the probe output of the measuring probe in each of measurement points in a quantity larger than or equal to the sum of the number of the linear correction elements and the number of the non-linear correction elements.

A second aspect of the present invention provides the above-described coordinate measuring machine, wherein the coordinate acquisition unit acquires the moving amount and the probe output at the time of the movement of measuring probe from a reference position where the probe output is 0 to each of the measurement points in a state where the measurement tip is restrained by the restraining unit at the reference position.

A third aspect of the present invention provides the above-described coordinate measuring machine, wherein the restraining unit is further configured not to restrain rotational displacement of a center of the measurement tip as a center of rotation.

A fourth aspect of the present invention provides the above-described coordinate measuring machine, wherein the restraining unit includes contact parts to be in contact with the measurement tip at positions of four vertices of a regular tetrahedron inscribed in the measurement tip.

A fifth aspect of the present invention provides the above-described coordinate measuring machine, wherein the restraining unit includes two pressing members, disposed to oppose each other with the measurement tip sandwiched therebetween, for pressing the measurement tip. The two pressing members each include two parallel columnar parts having an axis in a direction perpendicular to a direction along which the two pressing members oppose each other on a side of each of the two pressing members closer to the measurement tip. The direction of the axis of the columnar parts in one of the pressing members and the direction of the axis of the columnar parts in the other one of the pressing members are arranged perpendicular to each other, and the columnar parts are each provided with the contact part.

A sixth aspect of the present invention provides the above-described coordinate measuring machine, wherein the columnar parts are each formed in a circular cylinder and configured to be rotatable about the axis thereof.

A seventh aspect of the present invention provides the above-described coordinate measuring machine, wherein the restraining unit includes four pressing members for pressing the measurement tip toward the center of the measurement tip. The pressing members each include a spherical abutting member having the contact part, and a support member that rotatably supports the abutting member.

An eighth aspect of the present invention provides a coordinate correction method of a coordinate measuring machine, the coordinate measuring machine including: a measuring probe for movably supporting a stylus having a measurement tip to be brought into contact with an object to be measured and for providing a probe output according to a displacement of the measurement tip; a drive mechanism for moving the measuring probe relative to the object to be measured; and a processing device for computing shape coordinates of the object to be measured on the basis of the probe output and a moving amount of the measuring probe by the drive mechanism. The coordinate correction method includes: a step of restraining a translational displacement of the measurement tip; a step of acquiring the moving amount and the probe output of the measuring probe when the measuring probe is moved by the drive mechanism; a step of generating a correction matrix including linear correction elements and non-linear correction elements for respectively correcting linear coordinate components and non-linear coordinate components of the probe output with respect to the moving amount of the measuring probe with the moving amount and the probe output of the measuring probe acquired in each of measurement points in a quantity larger than or equal to the sum of the number of the linear correction elements and the number of the non-linear correction elements; and a step of correcting the probe output with the correction matrix.

A ninth aspect of the present invention provides the above-described coordinate correction method, wherein the step of restraining a translational displacement of the measurement tip is performed at a reference position where the probe output is 0.

A tenth aspect of the present invention provides the above-described coordinate correction method, wherein the step of restraining a translational displacement of the measurement tip further includes not-restraining rotational displacement of a center of the measurement tip as a center of rotation.

Advantageous Effects of Invention

According to the present invention, since the non-linear error of the probe output supplied from the measuring probe can be corrected, the shape coordinates of the object to be measured can be obtained with high accuracy.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

An example of an embodiment of the present invention will be described below in detail with reference to the drawings.

A coordinate measuring machine according to a first embodiment of the present invention will now be described with reference to FIGS. 1 to 5.

A general configuration of a coordinate measuring machine 100 will be described first.

Figure 1:
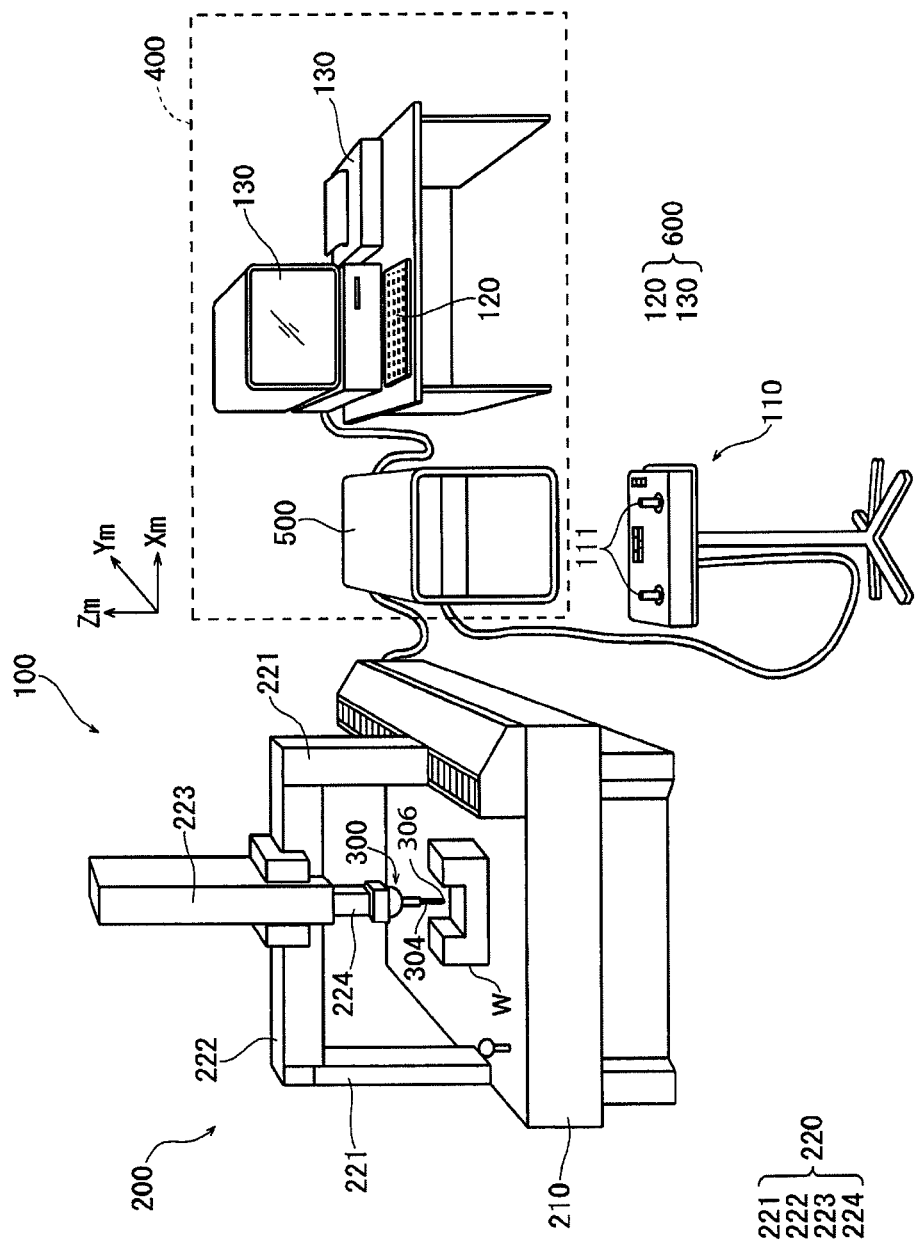
FIG. 1 is a schematic view showing an example of a coordinate measuring machine according to a first embodiment of the present invention.

As shown in FIG. 1, the coordinate measuring machine 100 includes: a machine body 200 that moves a measuring probe 300; operation unit 110 having manually-operated joysticks 111; and a processing device 400.

As shown in FIG. 1, the machine body 200 includes: a surface plate 210; a drive mechanism 220; a restraining unit 240 (FIG. 3A); and the measuring probe 300. The drive mechanism 220 is provided to stand on the surface plate 210 for holding and three-dimensionally moving the measuring probe 300 as shown in FIG. 1. Note that the drive mechanism is not limited thereto. For example, a drive mechanism may three-dimensionally move an object W to be measured by fixing the measuring probe and moving the surface plate itself which is positioned under the object W to be measured, or moving a member positioned on the surface plate and under the object W to be measured. Alternatively, a drive mechanism may three-dimensionally move both of the measuring probe and the object W to be measured. In other words, the drive mechanism may be any mechanism capable of moving the measuring probe relative to the object W to be measured.

Figure 2:
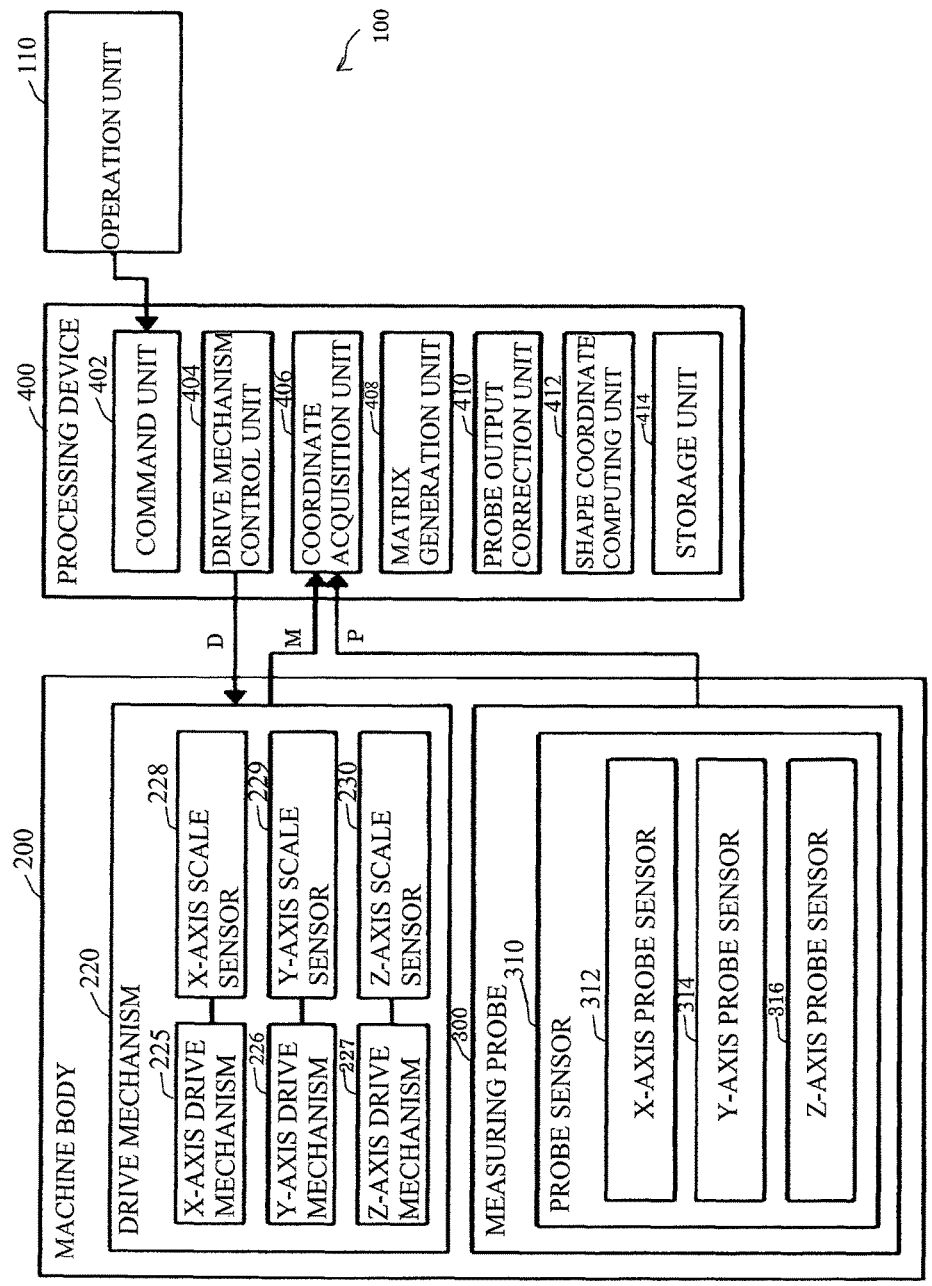
FIG. 2 is a block diagram of the coordinate measuring machine of FIG. 1.

Specifically, the drive mechanism 220 includes: beam supports 221 capable of moving in a Ym direction in an machine coordinate system; a beam 222 bridged between the beam supports 221; a column 223 capable of moving in an Xm direction in the machine coordinate system on the beam 222; and a spindle 224 capable of moving in a Zm direction in the machine coordinate system inside the column 223. An X-axis drive mechanism 225, a Y-axis drive mechanism 226, and a Z-axis drive mechanism 227 shown in FIG. 2 are provided between the beam 222 and the column 223, between the surface plate 210 and the beam supports 221, and between the column 223 and the spindle 224, respectively. The measuring probe 300 is supported by an end of the spindle 224. As shown in FIG. 2, the X-axis drive mechanism 225, the Y-axis drive mechanism 226, and the Z-axis drive mechanism 227 are provided with an X-axis scale sensor 228, a Y-axis scale sensor 229, and a Z-axis scale sensor 230, respectively. Thus, a moving amount $\{x_m, y_m, z_m\}^T$ (also simply referred to as "M") of the measuring probe 300 in the machine coordinate system can be obtained from outputs of the X-axis scale sensor 228, the Y-axis scale sensor 229, and the Z-axis scale sensor 230.

Figure 3A:
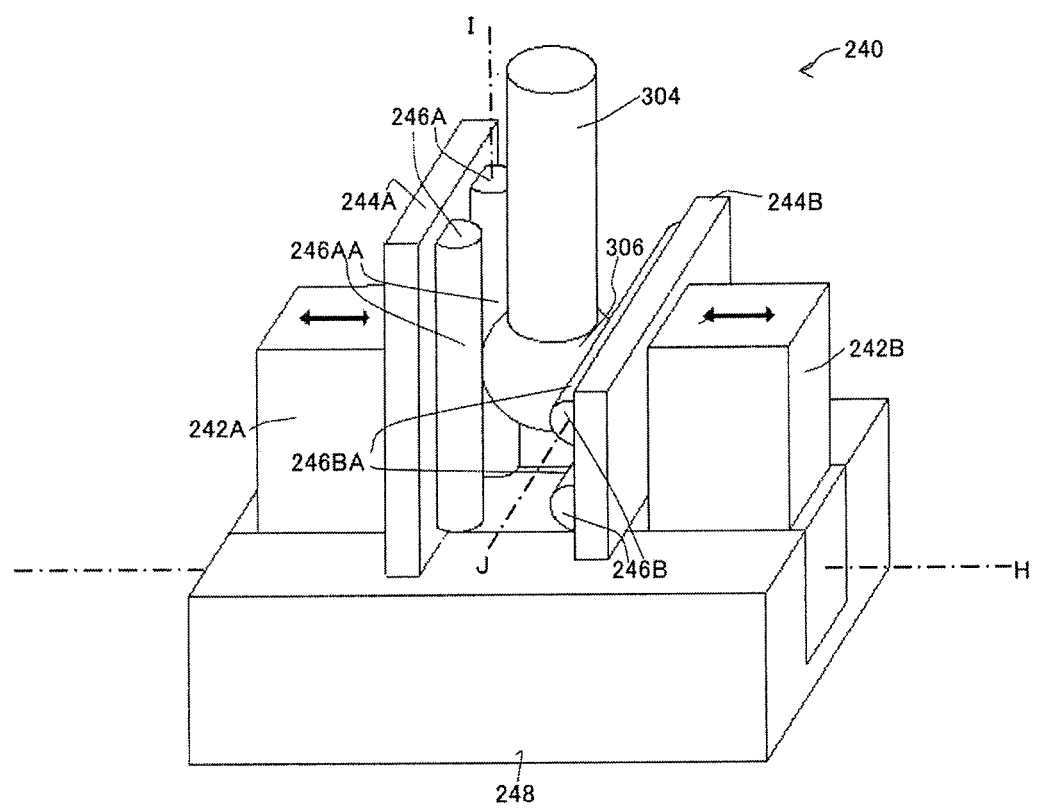
FIG. 3A is a perspective view showing restraining unit for restraining a translational displacement of a measurement tip in the coordinate measuring machine of FIG. 1.
Figure 3B:
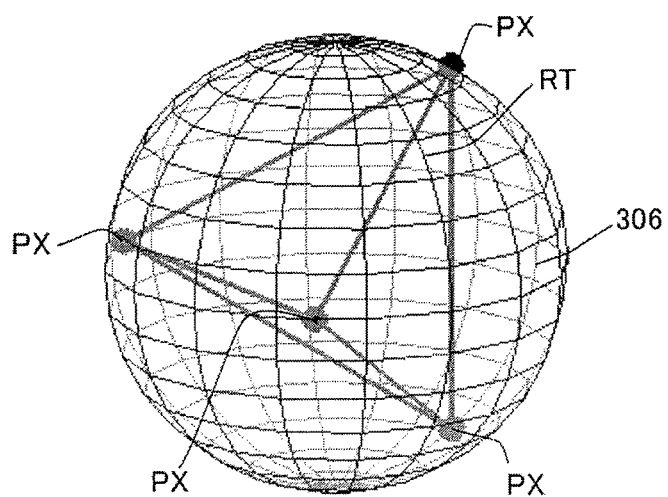
FIG. 3B is a diagram showing positions at which the measurement tip of the coordinate measuring machine of FIG. 1 is in contact with the restraining unit.

As shown in FIG. 3A, the restraining unit 240 is a member disposed on the surface plate 210 for restraining a translational displacement of a measurement tip 306 of the measuring probe 300. In addition, the restraining unit 240 is configured not to restrain rotational displacement of a center of the measurement tip 306 as a center of rotation. Specifically, the restraining unit 240 includes: two pressing members 242A and 242B; two plate-shaped members 244A and 244B; four columnar parts 246A and 246B; and a base member 248. The two pressing members 242A and 242B are each formed in a rectangular column. The pressing members 242A and 242B are disposed to be slidable, by hand or electrically, in a direction indicated by black arrows in FIG. 3A (i.e., an opposed direction H along which the two pressing members 242A and 242B are opposed to each other) along a groove provided in the base member 248 disposed on the surface plate 210. In other words, the two pressing members 242A and 242B can press the measurement tip 306 by being arranged to oppose each other with the measurement tip 306 sandwiched therebetween.

As shown in FIG. 3A, the plate-shaped members 244A and 244B are attached to opposed side surfaces of the two pressing members 242A and 242B, respectively. The plate-shaped members 244A and 244B are each formed in a rectangular shape having a plane perpendicular to the opposed direct on H, and longitudinal directions (directions I and J) thereof are perpendicular to each other. The two columnar parts 246A and the two columnar parts 246B are attached to opposed side surfaces of the plate-shaped members 244A and 244B, respectively, so that side surfaces thereof protrude. Axes of the two columnar parts 246A are arranged parallel to the direction I, and axes of the two columnar parts 246B are arranged in parallel to the direction J. Here, the directions I and J are both perpendicular to the opposed direction H. In other words, the two parallel columnar parts 246A and 246B having their axes in the directions I and J perpendicular to the opposed direction H are provided on the side of the two pressing members 242A and 242B closer to the measurement tip, respectively. The directions I and J are also perpendicular to each other. The side surfaces of the two columnar parts 246A and the side surfaces of the two columnar parts 246B serve as contact parts 246AA and 246BA to be brought into contact with the measurement tip 306. The measurement tip 306 is sandwiched between the columnar parts 246A and 246B. In other words, the axial directions I and J of the columnar parts 246A in one pressing member 242A and the columnar parts 246B in the other pressing member 242B are provided perpendicular to each other, and the columnar parts 246A and 246B are provided with the contact parts 246AA and 246BA, respectively. Since the four contact parts 246AA and 246BA are provided in total, the restraining unit 240 can restrain (restrict) a translational displacement of the measurement tip 306 in any direction. The contact parts 246AA and 246BA are further configured to be brought into contact with the measurement tip 306 at positions of four vertices PX of a regular tetrahedron RT inscribed in the measurement tip 306 shown in FIG. 3B.

Figure 4:
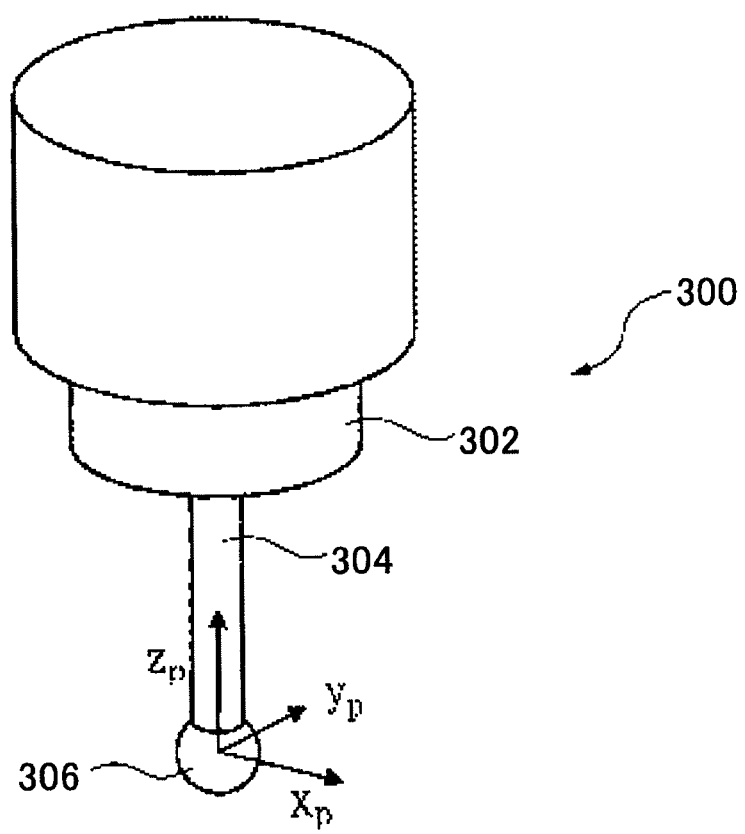
FIG. 4 is a perspective view showing a measuring probe of the coordinate measuring machine of FIG. 1.

The measuring probe 300 is what is called a scanning probe. As shown in FIG. 4, the measuring probe 300 movably supports a stylus 304 having the spherical measurement tip 306 to be brought into contact with the object W to be measured by a probe body 302. The measuring probe 300 provides a probe output $\{x_p, y_p, z_p\}^T$ (also simply referred to as "P") according to a displacement of the measurement tip 306. Here, the stylus 304 is supported by a spring structure that gives a non-linear response, for example, in the probe body 302. A displacement of the stylus 304 in the measuring probe 300 is detected by a probe sensor 310. As shown in. FIG. 2, the probe sensor 310 includes: an X-axis probe sensor 312 for detecting a displacement of the measurement tip 306 in an Xp direction in a probe coordinate system; a Y-axis probe sensor 314 for detecting a displacement of the measurement tip 306 in a Yp direction in the probe coordinate system; and a Z-axis probe sensor 316 for detecting a displacement of the measurement tip 306 in a Zp direction in the probe coordinate system. Thus, the probe output P, i.e., coordinates of the measurement tip 306 in the probe coordinate system, can be obtained from the outputs of the X-axis probe sensor 312, the Y-axis probe sensor 314, and the Z-axis probe sensor 316. Note that the X-axis probe sensor 312, the Y-axis probe sensor 314, and the Z-axis probe sensor 316 may not directly indicate the probe output P.

As shown in FIG. 2, the operation unit 110 is connected to a command unit 402 of the processing device 400. Various commands can be inputted to the machine body 200 and the processing device 400 via the operation unit 110.

As shown in FIG. 1, the processing device 400 includes a motion controller 500 and a host computer 600. The processing device 400 computes shape coordinates X of the object W to be measured on the basis of the probe output P and the moving amount M of the measuring probe 300 by the drive mechanism 220. The motion controller 500 mainly controls the movement and measurement of the measuring probe 300. The host computer 600 mainly processes measured results obtained in the machine body 200. In the present embodiment, the processing device 400 having a combined function of the motion controller 500 and the host computer 600 is shown in the block diagram of FIG. 2 and will be described below. The host computer 600 includes input unit 120 such as a keyboard and output unit 130 such as a display and a printer.

As shown in FIG. 2, the processing device 400 includes: the command unit 402, a drive mechanism control unit 404, a coordinate acquisition unit 406, a matrix generation unit 408, a probe output correction unit 410, a shape coordinate computing unit 412, and a storage unit 414.

The command unit 402 shown in FIG. 2 gives predetermined commands to the drive mechanism control unit 404 on the basis of commands inputted by the operation unit 110 or the input unit 120. The command unit 402 generates, as a positional command to the drive mechanism 220, a coordinate value in the machine coordinate system for each control cycle in consideration of, for example, moving directions, moving distances, moving speeds, and the like to move the measuring probe 300 to a plurality of positions (measurement points). For example, the command unit 402 may also issue a command about timing for acquiring both of the moving amount M of the measuring probe 300 by the drive mechanism 220 and the probe output P or the number of such acquisitions (the number n of measurement points) to the coordinate acquisition unit 406.

The drive mechanism control unit 404 shown in FIG. 2 can perform drive control by outputting a drive control signal D in response to a command from the command unit 402 and thereby passing an electric current through motors of the X-axis, Y-axis, and Z-axis drive mechanisms 225, 226, and 227 in the drive mechanism 220.

The coordinate acquisition unit 406 shown in FIG. 2 acquires the moving amount M of the measuring probe 300 in the machine coordinate system, which is outputted from the drive mechanism 220, and the probe output P in the probe coordinate system, which is outputted from the probe sensor 310, respectively. The coordinate acquisition unit 406 then computes the acquired data into a form (the number of data pieces and a data form) required in the matrix generation unit 408 and outputs the result to the matrix generation unit 408 (such computation may be performed in the matrix generation unit 408 and the coordinate acquisition unit 406 may only acquire the probe output P and the moving amount M of the measuring probe 300). Specifically, the coordinate acquisition unit 406 outputs a moving amount Mn and a probe output Pn of the measuring probe 300 corresponding to the number of measurement points (the number of acquisitions) n necessary to generate a correction matrix AA. At this time, regarding the probe output P, the coordinate acquisition unit 406 computes second-order or higher-order coordinate components $x_p^2$, $y_p^2$, $z_p^2$, ... and interference coordinate components $x_p y_p$, $y_p z_p$, $z_p x_p$, ... from the first-order coordinate components $x_p$, $y_p$ and $z_p$ of the probe output P. If no correction matrix AA is generated in the matrix generation unit 408, the coordinate acquisition unit 406 outputs the probe output P and the moving amount M of the measuring probe 300 to the probe output correction unit 410 and the shape coordinate computing unit 412 without changing their forms.

The matrix generation unit 408 shown in FIG. 2 generates the correction matrix AA on the basis of the outputs (the moving amount Mn and the probe output Pn of the measuring probe 300) from the coordinate acquisition unit 406. At this time, the measuring probe 300 is positioned in such a state that a translational displacement of the measurement tip 306 is being restrained at a position (reference position Pb) where the probe output P is 0, for example. Thereafter, when the measuring probe 300 is moved, the moving amount M of the measuring probe 300 from the reference position Pb and a probe output (transformed output PM) after corrected with the correction matrix AA have equal absolute values and inverted signs. In other words, the outputs (the moving amount Mn and the probe output Pn of the measuring probe 300) from the coordinate acquisition unit 406 satisfy Formula (4).

Formula (4)
$$\{Mn\} = -[AA]\{Pn\}$$

Formula (5)
$$\begin{Bmatrix} x_{m1} & x_{m2} & \cdots & x_{mn} \\ y_{m1} & y_{m2} & \cdots & y_{mn} \\ z_{m1} & z_{m2} & \cdots & z_{mn} \end{Bmatrix} = -\begin{bmatrix} A_{11} & A_{12} & A_{13} & A_{14} & A_{15} & A_{16} & A_{17} & A_{18} & A_{19} & \cdots \\ A_{21} & A_{22} & A_{23} & A_{24} & A_{25} & A_{26} & A_{27} & A_{28} & A_{29} & \cdots \\ A_{31} & A_{32} & A_{33} & A_{34} & A_{35} & A_{36} & A_{37} & A_{38} & A_{39} & \cdots \end{bmatrix} \times$$

-continued $$\begin{Bmatrix} x_{p1} & x_{p2} & \cdots & x_{pn} \\ y_{p1} & y_{p2} & \cdots & y_{pn} \\ z_{p1} & z_{p2} & \cdots & z_{pn} \\ x_{p1}^2 & x_{p2}^2 & \cdots & x_{pn}^2 \\ y_{p1}^2 & y_{p2}^2 & \cdots & y_{pm}^2 \\ z_{p1}^2 & z_{p2}^2 & \cdots & z_{pn}^2 \\ x_{p1}y_{p1} & x_{p2}y_{p2} & \cdots & x_{pn}y_{pn} \\ x_{p1}z_{p1} & x_{p2}z_{p2} & \cdots & x_{pn}z_{pn} \\ y_{p1}z_{p1} & y_{p2}z_{p2} & \cdots & y_{pn}z_{pn} \\ \vdots & \vdots & \cdots & \vdots \end{Bmatrix}$$

Where

Moving amount Mn of measuring probe 300: $\begin{Bmatrix} x_{m1} & x_{m2} & \cdots & x_{mn} \\ y_{m1} & y_{m2} & \cdots & y_{mn} \\ z_{m1} & z_{m2} & \cdots & z_{mn} \end{Bmatrix}$ Probe output Pn: $\begin{Bmatrix} x_{p1} & x_{p2} & \cdots & x_{pn} \\ y_{p1} & y_{p2} & \cdots & y_{pn} \\ z_{p1} & z_{p2} & \cdots & z_{pn} \\ x_{p1}^2 & x_{p2}^2 & \cdots & x_{pn}^2 \\ y_{p1}^2 & y_{p2}^2 & \cdots & y_{pm}^2 \\ z_{p1}^2 & z_{p2}^2 & \cdots & z_{pn}^2 \\ x_{p1}y_{p1} & x_{p2}y_{p2} & \cdots & x_{pn}y_{pn} \\ x_{p1}z_{p1} & x_{p2}z_{p2} & \cdots & x_{pn}z_{pn} \\ y_{p1}z_{p1} & y_{p2}z_{p2} & \cdots & y_{pn}z_{pn} \\ \vdots & \vdots & \cdots & \vdots \end{Bmatrix}$ Correction matrix AA: $\begin{bmatrix} A_{11} & A_{12} & A_{13} & A_{14} & A_{15} & A_{16} & A_{17} & A_{18} & A_{19} & \cdots \\ A_{21} & A_{22} & A_{23} & A_{24} & A_{25} & A_{26} & A_{27} & A_{28} & A_{29} & \cdots \\ A_{31} & A_{32} & A_{33} & A_{34} & A_{35} & A_{36} & A_{37} & A_{38} & A_{39} & \cdots \end{bmatrix}$ The correction matrix AA includes: linear correction elements for correcting linear coordinate components of the probe output P with respect to the moving amount M of the measuring probe 300; and non-linear correction elements for correcting non-linear coordinate components of the probe output P with respect to the moving amount M of the measuring probe 300. Note that the linear coordinate components refer to the first-order coordinate components $x_p$, $y_p$, and $z_p$ and the non-linear coordinate components refer to the second-order or higher-order coordinate components $x_p^2$, $y_p^2$, $z_p^2$, ... and the interference coordinate components $x_p y_p$, $y_p z_p$, $z_p x_p$, .... The linear correction elements refer to elements $A_{11}$, $A_{12}$, $A_{13}$, $A_{21}$, $A_{22}$, $A_{23}$, $A_{31}$, $A_{32}$, and $A_{33}$ by which the linear coordinate components $x_p$, $y_p$, and $z_p$ are multiplied. The non-linear correction elements refer to the other elements $A_{14}$, $A_{15}$, ..., $A_{24}$, $A_{25}$, ..., $A_{34}$, $A_{35}$, ... by which the non-linear coordinate components $x_p^2$, $y_p^2$, $z_p^2$, ..., $x_p y_p$, $y_p z_p$, $z_p x_p$, ... are multiplied.

In other words, as shown in Formula (6), the matrix generation unit 408 can generate the correction matrix AA by applying, for example, the least-squares method to Formula (4).

$$[AA] = -\{Mn\}\{Pn\}^T (\{Pn\}\{Pn\}^T)^{-1} \qquad \text{Formula (6)}$$

Note that the number n of the measurement points is set to be larger than or equal to the sum of the number of the linear correction elements and the number of the non-linear correction elements. In other words, the coordinate acquisition unit 406 acquires the moving amount M and the probe output P of the measuring probe 300 in each of the measurement points in a quantity larger than or equal to the sum of the number of the linear correction elements and the number of the non-linear correction elements.

The probe output correction unit 410 shown in FIG. 2 corrects the probe output P acquired by the coordinate acquisition unit 406 with the correction matrix AA outputted from the matrix generation unit 408. More specifically, the probe output correction unit 410 obtains a transformed output $\{x_{p\_m}, y_{p\_m}, z_{p\_m}\}^T$ (also referred to simply as "PM") in the machine coordinate system by correcting the probe output P with the correction matrix AA as shown in Formula (7).

$$\{PM\} = [AA]\{P\} \qquad \text{Formula (7)}$$

$$\begin{Bmatrix} x_{p\_m} \\ y_{p\_m} \\ z_{p\_m} \end{Bmatrix} = \qquad \text{Formula (8)}$$

$$\begin{bmatrix} A_{11} & A_{12} & A_{13} & A_{14} & A_{15} & A_{16} & A_{17} & A_{18} & A_{19} & \cdots \\ A_{21} & A_{22} & A_{23} & A_{24} & A_{25} & A_{26} & A_{27} & A_{28} & A_{29} & \cdots \\ A_{31} & A_{32} & A_{33} & A_{34} & A_{35} & A_{36} & A_{37} & A_{38} & A_{39} & \cdots \end{bmatrix}$$

$$\begin{Bmatrix} x_p \\ y_p \\ z_p \\ x_p^2 \\ y_p^2 \\ z_p^2 \\ x_p y_p \\ x_p z_p \\ y_p z_p \\ \vdots \end{Bmatrix}$$

The shape coordinate computing unit 412 shown in FIG. 2 computes the shape coordinates X of the object W to be measured by adding the transformed output PM supplied from the probe output correction unit 410 to the moving amount M of the measuring probe 300 acquired by the coordinate acquisition unit 406 as shown in Formula (9).

$$\{X\} = \{M\} + \{PM\} \qquad \text{Formula (9)}$$

The storage unit 414 shown in FIG. 2 stores initial values for various types of control, initial values for various types of processing, and programs, for example. The storage unit 414 also stores the correction matrix AA generated in the matrix generation unit 408.

Next, a procedure of coordinate correction according to the present embodiment will be described below mainly with reference to FIG. 5.

First, the restraining unit 240 is fixed at a predetermined position on the surface plate 210 in a measurement space. Thereafter, the measurement tip 306 is moved by the drive mechanism 220 to a space between the columnar parts 246A and the columnar parts 246B in the restraining unit 240. Thereafter, the measurement tip 306 is sandwiched by the columnar parts 246A and the columnar parts 246B to restrain a translational displacement of the measurement tip 306 (Step S2 in FIG. 5). At this time, the restraining unit 240 sandwiches the measurement tip 306 while abutting against the measurement tip 306 with a pressing force in a degree not to restrain rotational displacement of the center of the measurement tip 306 as the center of rotation. Such a pressing force can be stably controlled by incorporating, for example, pressure sensors (not shown) into the pressing members 242A and 242B.

Next, while keeping such a restrained state (state in which a translational displacement of the measurement tip 306 is restrained by the restraining unit 240), the measuring probe 300 is moved to a position at which the probe output P is 0 by the driving of the drive mechanism 220. The position at which the probe output P is 0 is set as the reference position Pb (in other words, the measuring probe 300 is moved to the reference position Pb) (Step S4 in FIG. 5).

Next, while keeping the restrained state, the measuring probe 300 is moved to a plurality of positions (identical with the number n of measurement points) in the measurement space by the drive mechanism 220 in accordance with the drive control signal D of the drive mechanism control unit 404. When the measuring probe 300 is moved to each of the plurality of positions, the coordinate acquisition unit 406 acquires the moving amount M of the measuring probe 300 from the reference position Pb and the probe output P (Step S6 in FIG. 5). In other words, while keeping the state in which the measurement tip 306 is restrained by the restraining unit 240 at the reference position Pb where the probe output is 0, the coordinate acquisition unit 406 acquires the moving amount M and the probe output P at the time of the movement of the measuring probe 300 from the reference position Pb to each of the measurement points. At this time, the number n of the measurement points is larger than or equal to the sum of the number of the linear correction elements and the number of the non-linear correction elements in the correction matrix AA. The measurement points are appropriately determined to cover all directions having a possibility of being displaced by the contact of the measurement tip 306 at the time of the measurement of the object W to be measured.

Figure 5:
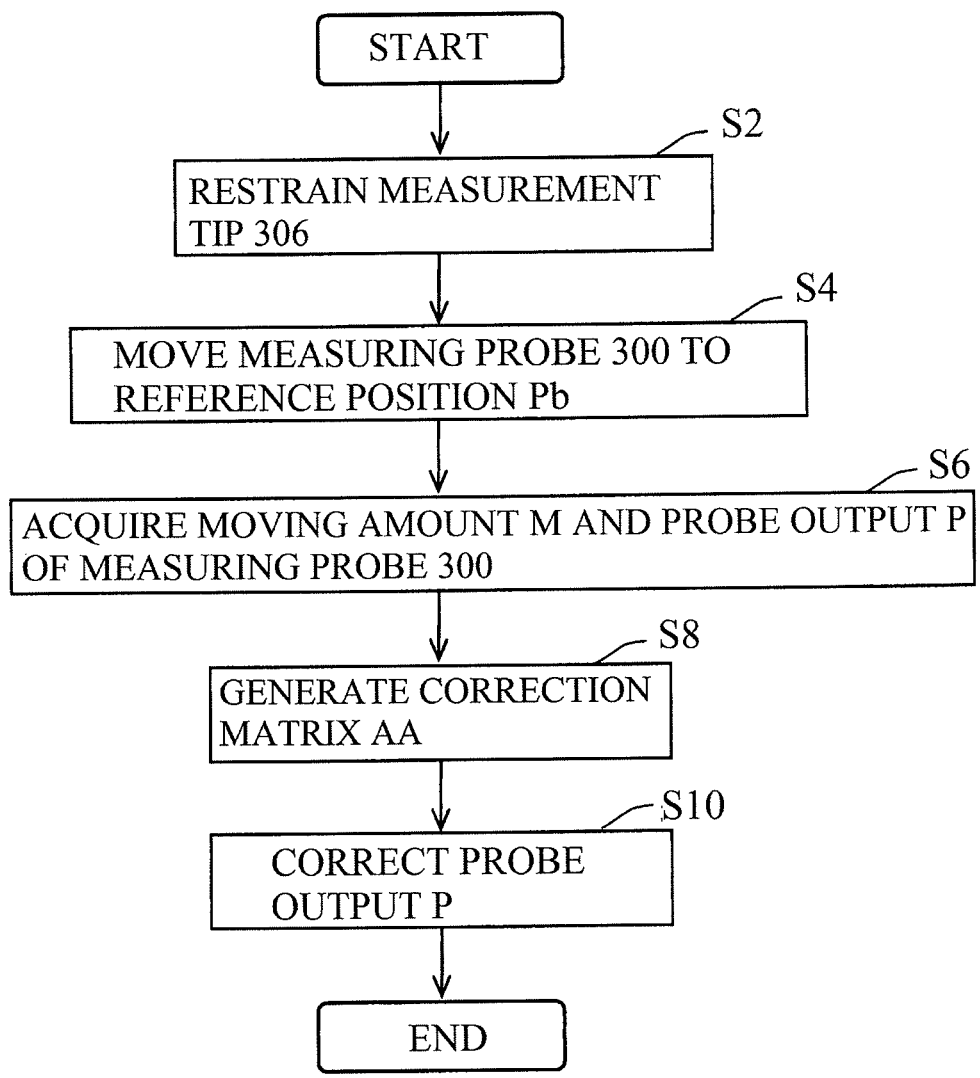
FIG. 5 is a flow chart showing a procedure of performing coordinate correction in the coordinate measuring machine of FIG. 1.

Next, the matrix generation unit 408 generates the correction matrix AA with the moving amount Mn and the probe output Pn of the measuring probe 300 corresponding to the n measurement points (Step S8 in FIG. 5).

Next, the probe output P is corrected with the correction matrix AA in the probe output correction unit 410 so as to obtain the transformed output PM (Step S10 in FIG. 5). Thereafter, the shape coordinates X are computed in the shape coordinate computing unit 412 by combining the moving amount M of the measuring probe 300 and the transformed output PM.

As described above, the moving amount M and the probe output P of the measuring probe 300 are acquired when the measuring probe 300 is moved by the drive mechanism 220 in such a state that a translational displacement of the measurement tip 306 is restrained by the restraining unit 240. This can clarify the correspondence between the moving amount M and the probe output P of the measuring probe 300 and thus allows for the generation of the correction matrix AA without requiring complicated computation.

If the position at which a translational displacement of the measurement tip 306 is restrained is undefined, the moving amount M of the measuring probe 300 and its direction need to be changed in a program for moving the measuring probe 300 each time restraining the measurement tip 306. If the measurement tip 306 is restrained at a position other than the reference position Pb, an amount of time needed to move the measuring probe 300 to a measurement point is increased. In the present embodiment, in contrast, a translational displacement of the measurement tip 306 is restrained by the restraining unit 240 at the reference position Pb where the probe output P is 0. This can make the probe output P with respect to the moving amount M of the measuring probe 300 clear. Consequently, the measurement procedure can be simplified, the measurement time can be shortened, and the correction matrix AA can be generated with simpler computation.

In the present embodiment, the correction matrix AA includes the linear correction elements and the non-linear correction elements for respectively correcting the linear coordinate components and the non-linear coordinate components of the probe output P with respect to the moving amount M of the measuring probe 300. Thus, even when a spring structure of a member for movably supporting the stylus 304 in the measuring probe 300 or the probe sensor 310 for detecting a displacement of the stylus 304 provides a non-linear response, the probe output P in such a case can be corrected. At this time, correction of the conventional technique are simultaneously performed, and as a result, correction accuracy in the present embodiment can be enhanced as compared to the conventional technique. Note that a greater number of the non-linear correction elements can make the correction effect larger. Therefore, in view of an amount of computing time and configuration for the correction, a pronounced effect can be expected when up to about third-order or fourth-order non-linear coordinate components are corrected, for example.

In the present embodiment, the restraining unit 240 is configured to restrain a translational displacement of the measurement tip 306 and not to restrain rotational displacement of the center of the measurement tip 306 as the center of rotation. In other words, since rotational displacement of the measurement tip 306 is not restrained when the measuring probe 300 is moved, a motion of the measuring probe 300 (a translational displacement and a rotational displacement of the measurement tip 306), which occurs at the time of measuring a general object W to be measured, can be reproduced when the measuring probe 300 is moved to a measurement point in such a state that a translational displacement of the measurement tip 306 is restrained by the restraining unit 240. Thus, the correction matrix AA can be obtained with high accuracy. Note that the present invention is not limited thereto. For example, the restraining unit 240 may be configured to restrain a rotational displacement of the measurement tip 306 to some extent. Also in such a case, the correction matrix AA can be obtained with reasonable accuracy.

In the present embodiment, the restraining unit 240 includes the contact parts 246AA and 246BA to be brought into contact with the measurement tip 306 at the positions of the four vertices PX of the regular tetrahedron RT inscribed in the measurement tip 306. In other words, the restraining unit 240 has a minimum number (four) of the contact parts 246AA and 246BA to restrain a translational displacement of the measurement tip 306 in any direction, and the contact parts 246AA and 246BA are positioned at spatially equal intervals. Consequently, a force applied to the measurement tip 306 can be distributed in a spatially equal manner. This can prevent an excessive amount of force from being applied only to part of four contact points between the measurement tip 306 and the contact parts 246AA and 246BA. Note that the present invention is not limited thereto. For example, contact parts may not be located at the positions of the vertices PX of the regular tetrahedron RT, or five or more contact parts may be provided.

In the present embodiment, the restraining unit 240 includes the two pressing members 242A and 242B, disposed to oppose each other with the measurement tip 306 sandwiched therebetween, for pressing the measurement tip 306. The two parallel columnar parts 246A and 246B having their axes in the directions I and J, respectively, are provided on the side of the two pressing members 242A and 242B closer to the measurement tip. The directions I and J are arranged perpendicular to each other, and the columnar parts 246A and 246B are provided with the contact parts 246AA and 246BA, respectively. In other words, with such a simple configuration, the restraining unit 240 can avoid restraining a rotational displacement of the measurement tip 306 while easily restraining a translational displacement of the measurement tip 306 by adjusting a distance between the pressing members 242A and 242B.

In other words, a non-linear error of the probe output P supplied from the measuring probe 300 can be corrected in the present embodiment, and thus the shape coordinates X of the object W to be measured can be obtained with high accuracy.

While the present invention has been described with reference to the first embodiment, the present invention is not limited to the first embodiment. In other words, modifications and variations in design can be effected without departing from the scope of the present invention.

For example, while the restraining unit 240 is configured such that the columnar parts 246A and 246B are fixedly supported by the pressing members 242A and 242B in the first embodiment, the present invention is not limited thereto. For example, the present invention may be configured as in a second embodiment shown in FIG. 6A. In the following description, already-described elements will be denoted by the same reference numerals as in the first embodiment, and the description thereof will be omitted.

Figure 6A:
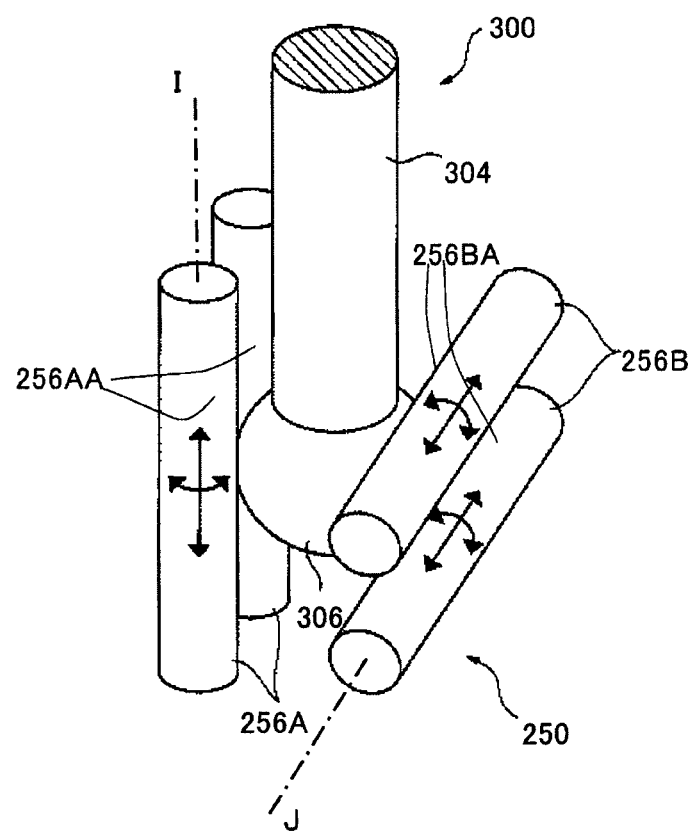
FIG. 6A is a diagram showing restraining unit according to a second embodiment of the present invention.

The second embodiment is different from the first embodiment in that columnar parts 256A and 256B are each formed in a circular cylinder and configured to be rotatable about its axis and movable to some extent in its axial direction as shown in FIG. 6A. Also in such a case, contact parts 256AA and 256BA are side surfaces of the columnar parts 256A and 256B.

As just described, the present embodiment can yield advantageous effects similar to those in the first embodiment. In addition, the columnar parts 256A and 256B can each rotate according to a rotational displacement of a measurement tip 306 and move, to some extent, in its axial direction. Thus, restraining unit 250 can restrain a translational displacement of the measurement tip 306 without restraining a rotational displacement of the measurement tip 306 even when a pressing force to the measurement tip 306 by the pressing members is large to some extent.

Figure 6B:
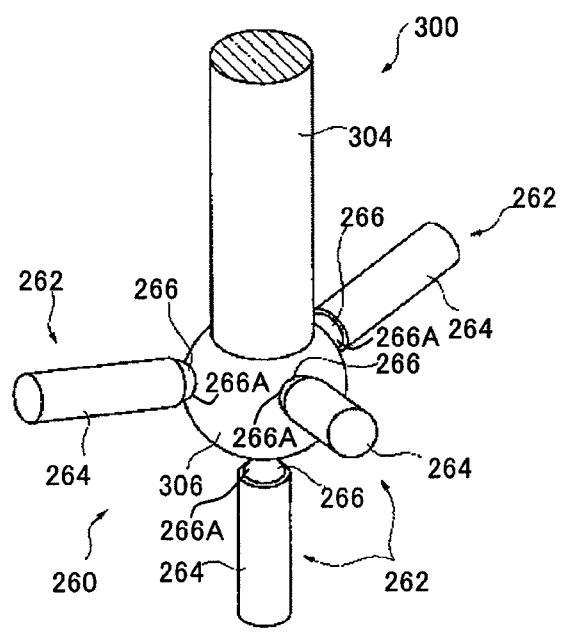
FIG. 6B is a diagram showing restraining unit according to a third embodiment of the present invention.

Alternatively, the present invention may be configured as in a third embodiment shown in FIG. 6B. In the following description, already-described elements will be denoted by the same reference numerals as in the first embodiment, and the description thereof will be omitted.

The third embodiment is different from the first embodiment in that restraining unit 260 includes four pressing members 262 and an abutting member 266 provided in each of the pressing members 262 abuts against a measurement tip 306 as shown in FIG. 6B. Specifically, the restraining unit 260 includes the four pressing members 262 to press the measurement tip 306 toward the center of the measurement tip 306. Each of the pressing members 262 includes the spherical abutting member 266 having a contact part 266A, and a support member 264 for rotatably supporting the abutting member 266. The contact part 266A is a surface of the abutting member 266.

As just described, with such a simple configuration of the restraining unit 260, the present embodiment can also yield advantageous effects similar to those in the first embodiment. In addition, the abutting member 266 is in a spherical shape, and the support member 264 rotatably supports the abutting member 266. Thus, the restraining unit 260 can restrain a translational displacement of the measurement tip 306 without restraining a rotational displacement of the measurement tip 306 in any direction.

Figure 7A:
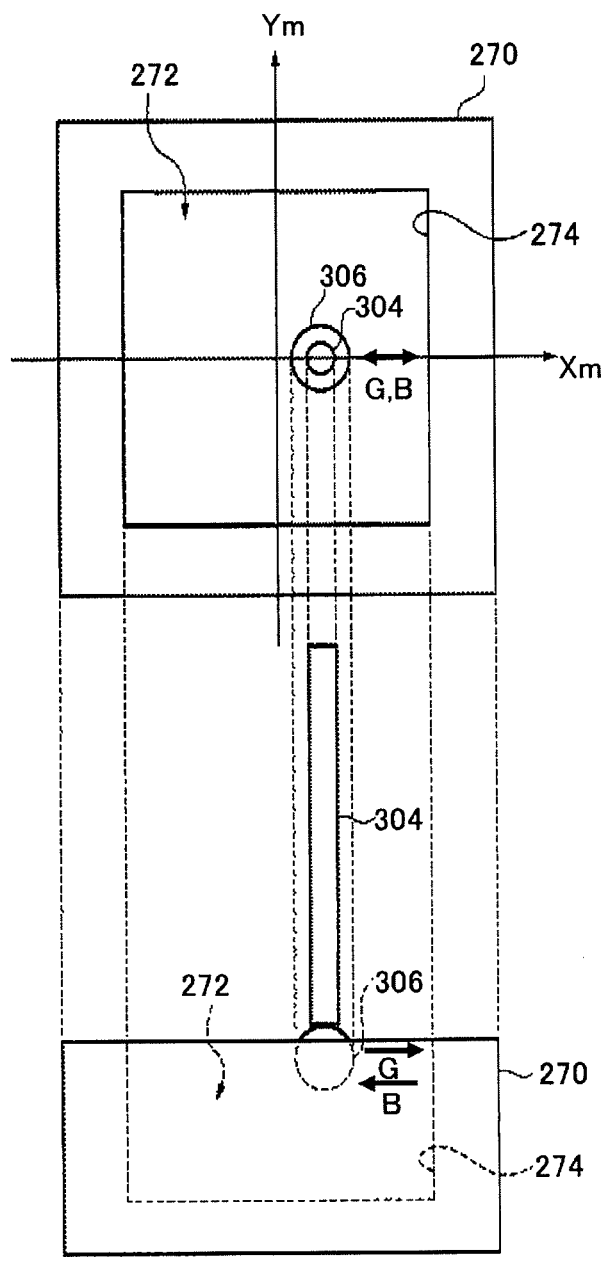
FIG. 7A is a diagram showing restraining unit according to a fourth embodiment of the present invention.

Alternatively, the present invention may be configured as in a fourth embodiment shown in FIG. 7A. In the following description, already-described elements will be denoted by the same reference numerals as in the first embodiment, and the description thereof will be omitted.

The fourth embodiment is different from the above embodiments in that restraining unit 270 is a member formed in the shape of a container with a cavity in which an inner surface thereof has a polygonal cross-section as shown in FIG. 7A. Specifically, the restraining unit 270 is formed in a rectangular solid shape and provided with a square (may be pentagon or hexagon-shaped) recess 272 as viewed in a top plan view. An inner surface of the recess 272 serves as a contact surface 274 to be in contact with a measurement tip 306.

A procedure of coordinate correction with the restraining unit 270 will now be described below mainly with reference to FIGS. 7A and 8.

First, the restraining unit 270 is fixed at a predetermined position on a surface plate 210 in a measurement space. Thereafter, the measurement tip 306 is moved by a drive mechanism 220 to the recess 272 of the restraining unit 270. In order to bring the measurement tip 306 into contact with the contact surface 274 from a normal direction (direction G) to the contact surface 274, a measuring probe 300 is moved so that the measurement tip 306 approaches the contact surface 274 (Step S12 in FIG. 8). By bringing the measurement tip 306 into contact with the contact surface 274, a translational displacement of the measurement tip 306 is restrained by the contact surface 274 (Step S14 in FIG. 8). A position at which a translational displacement of the measurement tip 306 is restrained and a probe output P is 0 (including when the probe output P represents a value of a noise level) is defined as a reference position Pb (the reference position Pb may be determined by setting a threshold value of the probe output P to discriminate the noise level, or conductive surfaces may be formed on the contact surface 274 and the measurement tip 306 to determine the reference position Pb on the basis of the presence or absence of conduction between the contact surface 274 and the measurement tip 306).

Next, while keeping such a restrained state, the measuring probe 300 is moved in the direction G by the drive mechanism, 220 in accordance with a drive control signal D of a drive mechanism control unit 404. When a predetermined displacement amount is achieved, the moving direction of the measuring probe 300 is inverted in a direction B opposite to the direction G. A plurality of measurement points are provided along the series of movements of the measuring probe 300, and a coordinate acquisition unit 406 acquires a moving amount M and the probe output P at the time of the movement of the measuring probe 300 from the reference position Pb to each of measurement points (Step S16 in FIG. 8). In other words, also in the present embodiment, while restraining the measurement tip 306 by the restraining unit 270 at the reference position Pb where the probe output P is 0, the coordinate acquisition unit 406 acquires, the moving amount M and the probe output P at the time of the movement of the measuring probe 300 from the reference position Pb to each of the measurement points. Note that rotational displacement, of the measurement tip 306 is not restrained because the measurement tip 306 is in contact with the contact surface 274 only at a single point even when the measuring probe 300 is moved in the direction G or B. At the same time, a position on the contact surface 274 that is in contact with the measurement tip 306 at a single point is unchanged when the measuring probe 300 is moved in the direction G or B.

Figure 8:
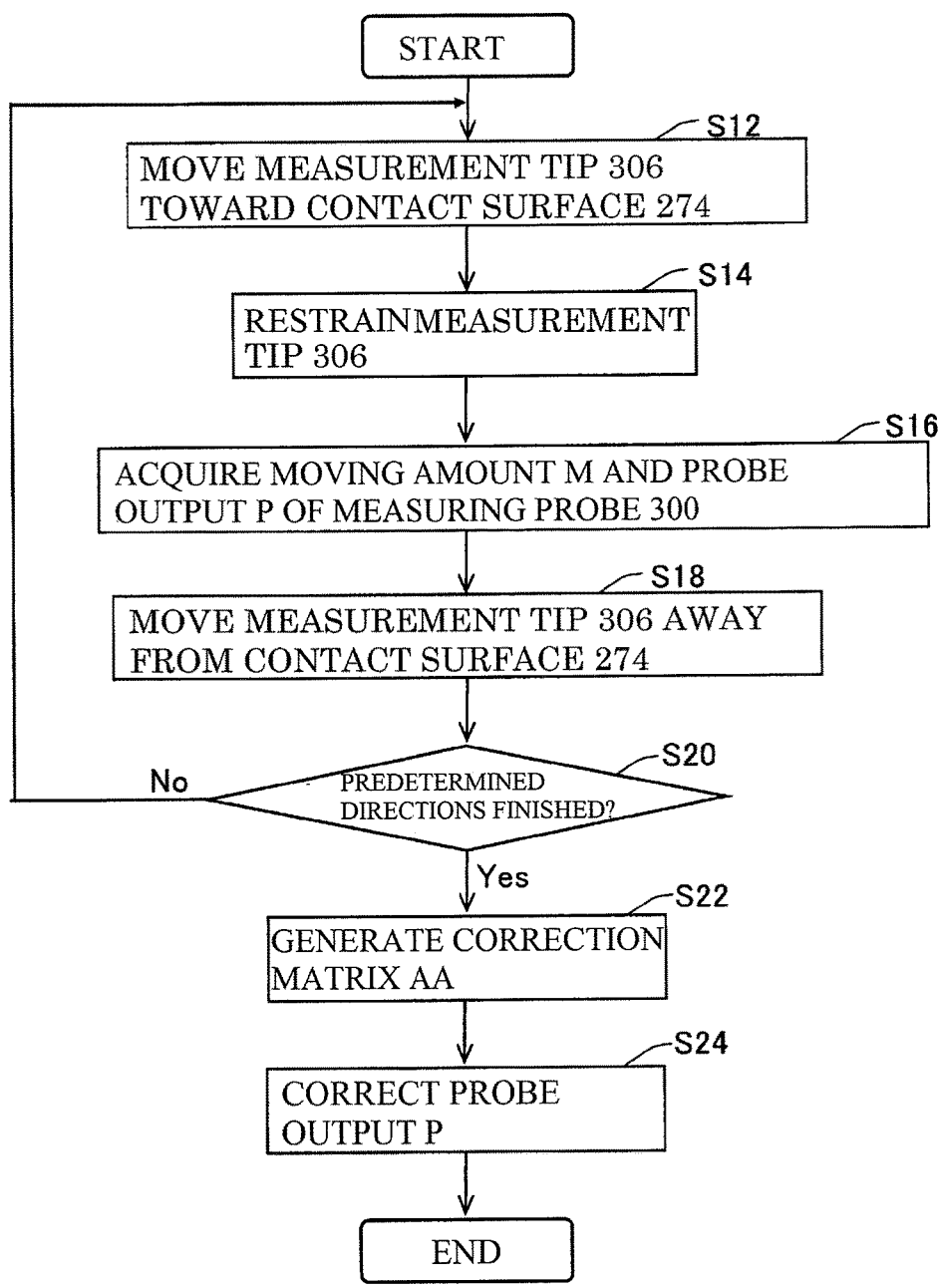
FIG. 8 is a flow chart showing a procedure of performing coordinate correction with the restraining unit of FIG. 7A.

Next, the measuring probe 300 is moved in the direction B to separate the measurement tip 306 away from the contact surface 274 (Step S18 in FIG. 8). Whether the measurement tip 306 is separated away from the contact surface 274 may be determined in a similar manner as the above-described determination of the reference position Pb. The series of movements of the measuring probe 300 is performed in an Xm direction, and the moving amount M and the probe output P of the measuring probe 300 are acquired at each of measurement points in the Xm direction. While the number of the measurement points may be larger than or equal to the sum of the number of linear correction elements and the number of non-linear correction elements in a correction matrix AA, the series of movements of the measuring probe 300 is performed in a predetermined direction other than the Xm direction (Step S20 in FIG. 8). More specifically, by performing and completing the steps from S12 through S18 in FIG. 8 in a plurality of predetermined directions other than the Xm direction (Yes in Step S20 in FIG. 8), the moving amount M and the probe output P of the measuring probe 300 are acquired at each of n measurement points.

Next, a matrix generation unit 408 generates the correction matrix AA with a moving amount Mn and a probe output Pn of the measuring probe 300 corresponding to the n measurement points (Step S22 in FIG. 8).

Next, a probe output correction unit 410 obtains a transformed output PM by correcting the probe output P with the correction matrix AA (Step S24 in FIG. 8). Thereafter, shape coordinates are computed in a shape coordinate computing unit 412 by combining the moving amount M of the measuring probe 300 and the transformed output PM.

As just described, the present embodiment can also yield advantageous effects similar to those in the first embodiment. Furthermore, the restraining unit 270 has a simpler configuration, includes no movable parts, and can restrain a translational displacement of the measurement tip 306 without restraining a rotational displacement of the measurement tip 306 in any direction.

Figure 7B:
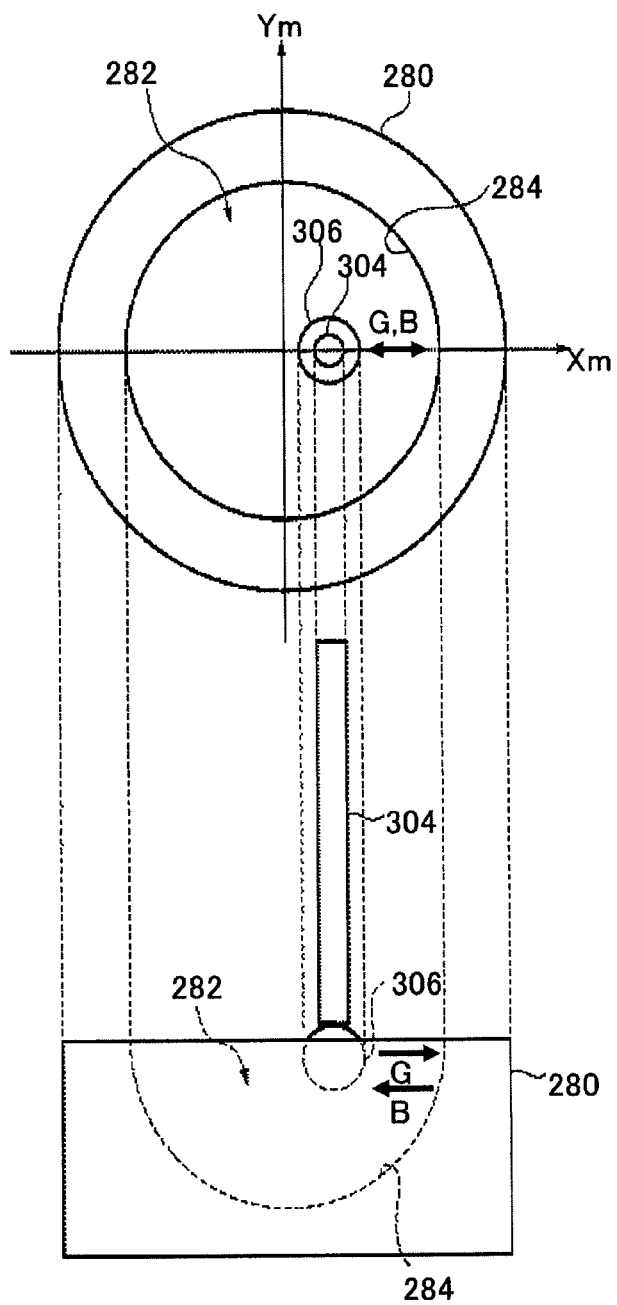
FIG. 7B is a diagram showing restraining unit according to a fifth embodiment of the present invention.

Restraining unit that can be used in a similar manner as the restraining unit 270 of the fourth embodiment is shown in FIG. 7B as restraining unit of a fifth embodiment. In the following description, already-described elements will be denoted by the same reference numerals as in the first embodiment, and the description thereof will be omitted.

In the fifth embodiment, restraining unit 280 is configured as a member formed in the shape of a container with a cavity in which an inner surface thereof has a circular cross section as shown in FIG. 7B. Specifically, the restraining unit 280 is formed in a cylindrical shape and a semispherical recess 282 is provided from the upper surface of the restraining unit 280. An inner surface of the recess 282 serves as a contact surface 284 to be in contact with a measurement tip 306.

As just described, the present embodiment can also yield advantageous effects similar to those in the fourth embodiment. In addition, the spherical contact surface 284 of the restraining unit 280 allows for the setting of an innumerable number of normal directions to the contact surface 284. Thus, a moving amount M and a probe output P of a measuring probe 300 for generating a correction matrix AA can be acquired in various directions, and the correction matrix AA can be therefore generated with higher accuracy.

Without being limited to the above configurations, restraining unit may alternatively be configured with one or more reference spheres, for example.

In the above-described embodiments, while restraining the measurement tip 306 by the restraining unit at the reference position Pb where the probe output P is 0, the coordinate acquisition unit 406 acquires, the moving amount M and the probe output P at the time of the movement of the measuring probe 300 from the reference position Pb to each of the measurement points. In other words, the reference position Pb is used in the above-described embodiments so that the moving amount M of the measuring probe 300 and the probe output P corrected with the correction matrix AA have equal absolute values and inverted signs. However, the present invention is not limited thereto. For example, any configuration that enables the coordinate acquisition unit 406 to acquire the moving amount M and the probe output P of the measuring probe 300 when the measuring probe 300 is moved by the drive mechanism 220 in such a state that the measurement tip 306 is restrained by restraining unit may be employed. This is because clarifying the correspondence between the moving amount M and the probe output P of the measuring probe 300 enables the obtainment of the correction matrix AA.

The present invention can be applied to a wide variety of coordinate measuring machines for measuring a three-dimensional shape of an object to be measured.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

The invention claimed is:
1. A coordinate measuring machine comprising:
a measuring probe that movably supports a stylus having a measurement tip to be brought into contact with an object to be measured, and that provides a probe output according to a displacement of the measurement tip;
a driver that moves the measuring probe relative to the object to be measured;
a processor that computes shape coordinates of the object to be measured on a basis of the probe output and a moving amount of the measuring probe by the driver; and
a restrainer that restrains a translational displacement of the measurement tip, wherein:
the processor comprises, as a configuration when the processor executes instructions stored in a memory:
a coordinate acquisition processor that acquires the moving amount and the probe output of the measuring probe when the measuring probe is moved by the driver in a state where the measurement tip is restrained by the restrainer;
a matrix generator that generates a correction matrix including linear correction elements and non-linear correction elements for respectively correcting linear coordinate components and non-linear coordinate components of the probe output with respect to the moving amount of the measuring probe on a basis of an output of the coordinate acquisition processor; and a probe output corrector that corrects the probe output with the correction matrix, and the coordinate acquisition processor acquires the moving amount and the probe output of the measuring probe in each of measurement points in a quantity larger than or equal to a sum of a number of the linear correction elements and a number of the non-linear correction elements.

2. The coordinate measuring machine according to claim 1, wherein the coordinate acquisition processor acquires the moving amount and the probe output at the time of the movement of the measuring probe from a reference position where the probe output is 0 to each of the measurement points in a state where the measurement tip is restrained by the restrainer at the reference position.

3. The coordinate measuring machine according to claim 2, wherein the restrainer is further configured to not restrain rotational displacement of a center of the measurement tip as a center of rotation.

4. The coordinate measuring machine according to claim 3, wherein the restrainer includes contact surfaces configured to be in contact with the measurement tip at positions of four vertices of a regular tetrahedron inscribed in the measurement tip.

5. The coordinate measuring machine according to claim 4, wherein:

the restrainer includes two presses, configured to oppose each other with the measurement tip sandwiched therebetween, and to press the measurement tip, the two presses each include two parallel columns having an axis in a direction perpendicular to a direction along which the two presses oppose each other on a side of each of the two presses closer to the measurement tip, a direction of the axis of the columns in one of the presses and a direction of the axis of the columns in the other one of the presses are arranged perpendicular to each other, and the columns are each provided with the contact surface.

6. The coordinate measuring machine according to claim 5, wherein the columns are each formed in a circular cylinder and configured to be rotatable about the axis thereof.

7. The coordinate measuring machine according to claim 4, wherein:

the restrainer includes four presses that press the measurement tip toward the center of the measurement tip, and the presses each include a sphere having the contact surface, and a support that rotatably supports the sphere.

8. A coordinate correction method of a coordinate measuring machine, the coordinate measuring machine including: a measuring probe for movably supporting a stylus having a measurement tip to be brought into contact with an object to be measured and for providing a probe output according to a displacement of the measurement tip; a drive mechanism for moving the measuring probe relative to the object to be measured; and a processing device for computing shape coordinates of the object to be measured on a basis of the probe output and a moving amount of the measuring probe by the drive mechanism, the coordinate correction method comprising:

restraining a translational displacement of the measurement tip;

acquiring the moving amount and the probe output of the measuring probe when the measuring probe is moved by the drive mechanism;

generating a correction matrix including linear correction elements and non-linear correction elements for respectively correcting linear coordinate components and non-linear coordinate components of the probe output with respect to the moving amount of the measuring probe with the moving amount and the probe output of the measuring probe acquired in each of measurement points in a quantity larger than or equal to a sum of a number of the linear correction elements and a number of the non-linear correction elements; and correcting the probe output with the correction matrix.

9. The coordinate correction method according to claim 8, wherein the restraining of a translational displacement of the measurement tip is performed at a reference position where the probe output is 0.

10. The coordinate correction method according to claim 9, wherein the restraining of a translational displacement of the measurement tip further includes not restraining rotational displacement of a center of the measurement tip as a center of rotation.

* * * * *